United States Patent Office 3,074,502
Patented Jan. 22, 1963

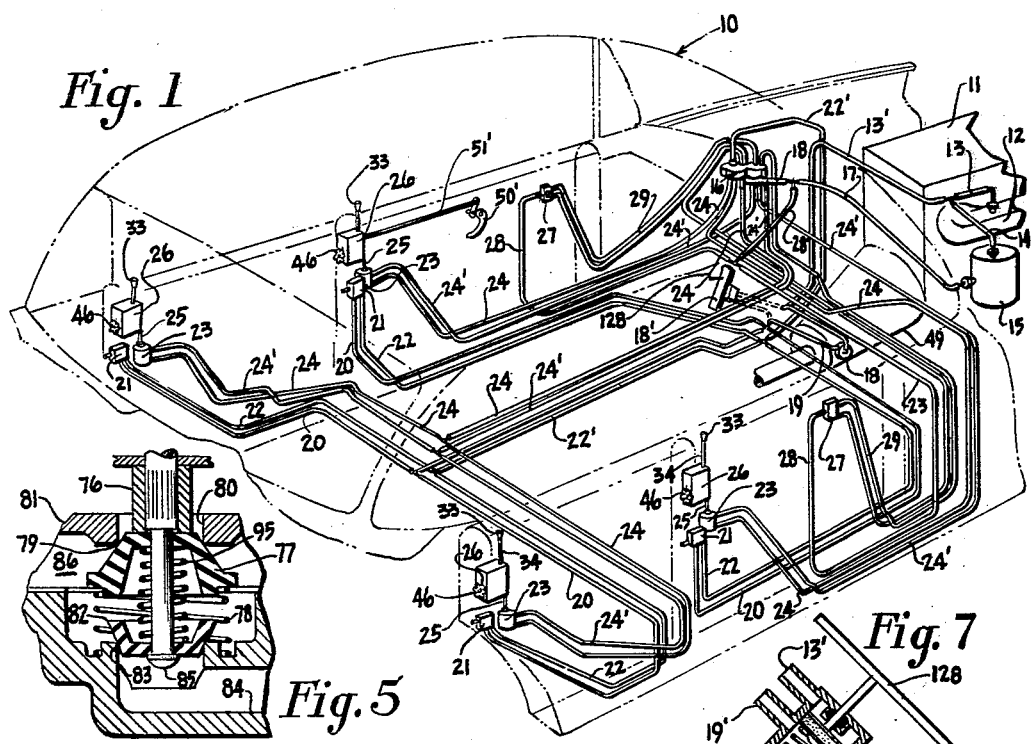
Fig. 1
Fig. 5
Fig. 6
Fig. 3
Fig. 7
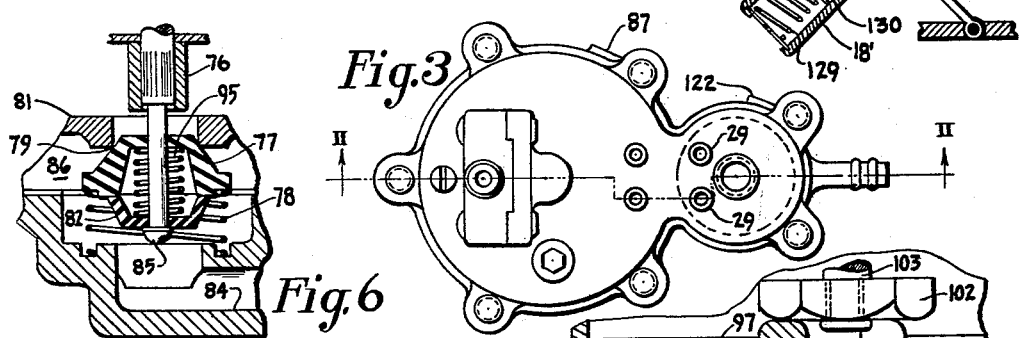
Fig. 4
Fig. 8
INVENTORS
RAYMOND A. DEIBEL and
WILLIAM C. RIESTER
BY Bean Brooks Buckley + Bean
ATTORNEYS

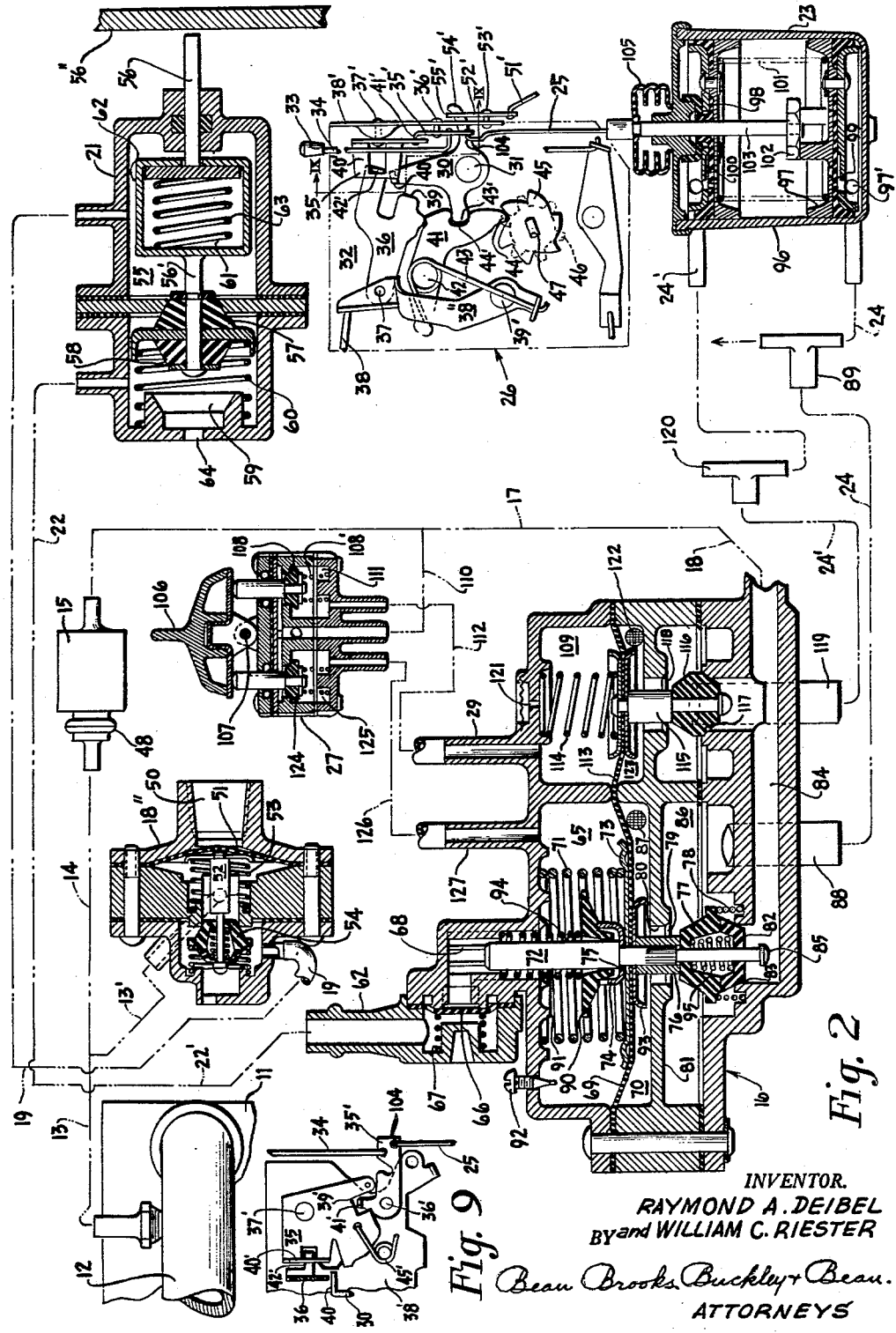

3,074,502
DOOR LOCKING SYSTEM FOR MOTOR VEHICLES
Raymond A. Deibel, Cheektowaga, and William C. Riester, Williamsville, N.Y., assignors to Trico Products Corporation, Buffalo, N.Y.
Filed Aug. 27, 1958, Ser. No. 757,566
11 Claims. (Cl. 180—82)

This invention relates to a vehicle door locking system, and more particularly to an arrangement for automatically maintaining the doors of a vehicle locked against unauthorized intrusion and for permitting remote unlocking of the vehicle doors.

It is the primary object of this invention to provide an automatic locking arrangement for maintaining the doors of a vehicle locked against unauthorized intrusion under substantially all conditions of vehicle operation and for positively preventing a vehicle operator from being locked out of the vehicle by the inadvertent operation of the automatic locking arrangement when the vehicle is left unattended. Other objects and attendant advantages of the present invention will readily be perceived hereafter.

The foregoing object is achieved by a unique disposition of valves which cause door locking motors to automatically lock the vehicle doors on the initial starting of the vehicle or relock the doors after a passenger has entered or left the vehicle while its engine remains in operation. Furthermore, the doors are maintained in a locked condition regardless of any subsequent condition of operation of the vehicle until they are deliberately unlocked by the vehicle operator or another person within the vehicle. Thus, the doors are maintained locked against entry from outside the vehicle during substantially all conditions of operation. Furthermore, in the event it is desired to unlock a vehicle door from a remote position to permit a person to enter the vehicle, the operator need merely manipulate a simple control within his convenient reach. Upon resumption of operation of the vehicle, the above mentioned valve arrangement will cause the doors to be locked automatically without any requirement for deliberate action on the part of the vehicle operator. Furthermore, it is a common practice for a vehicle operator to leave a vehicle unattended with its engine running. However, to safeguard against the operator being locked out of the vehicle, an arrangement is provided for insuring that the vehicle doors cannot be automatically relocked when the vehicle is left unattended with its engine in operation. Relocking can only occur when the operation of the vehicle is resumed.

In its more specific aspects, the present invention includes fluid pressure operated motors for operating latch locks associated with the doors of the vehicle. A source of fluid pressure within the vehicle is caused to selectively communicate with these motors for causing automatic locking of the door locks in response to the normal operation of the vehicle and for causing unlocking of the door locks in response to a deliberate act on the part of the vehicle operator. A distributor valve is associated with this system for causing communication between the fluid pressure source and the door locking motors when an increase in manifold vacuum is experienced upon the starting of the vehicle to thereby cause automatic locking of the latch locks. Once the latch locks have been actuated in the foregoing manner, mechanism within the distributor valve automatically terminates the communication of the fluid pressure and also places the distributor valve in a condition where it will not recycle in response to fluctuations of manifold pressure during normal operation of the vehicle. However, when the vehicle engine is stopped the mechanism within the distributor valve is reset in response to the absence of manifold vacuum so that it will cause automatic locking of the vehicle doors when the engine is again started. However, under certain conditions, a vehicle door is opened for the purpose of permitting a passenger to enter or depart, without stopping the engine. In order to reset the above mentioned distributor valve, a second valve is provided within the vehicle door. When the vehicle door is opened, the door valve vents the distributor valve to cause it to return to the position which it normally assumes when there is an absence of manifold vacuum. When the vehicle door is subsequently closed, the venting is terminated so that the distributor valve recycles in response to the manifold vacuum to cause the door locking motors to place the doors in a locked condition. Furthermore, a vehicle is often left unattended with its engine in operation. In order to insure that the closing of the vehicle door will not result in the relocking thereof, in the above described manner, an anti-lockout valve is provided for preventing communication between the engine intake manifold and the distributor valve while the vehicle is at a standstill, thereby precluding the possibility of the operator being locked out due to automatic operation of the locking system. In one embodiment of the present invention, the anti-lockout valve is responsive to the pressure produced by the rear pump of an automatic transmission, this pressure being produced only when the vehicle is in motion. When there is an absence of pressure, as occurs when the vehicle is at a standstill, the anti-lockout valve is closed to prevent communication between the intake manifold and the distributor valve, and it is not until the vehicle resumes motion that the anti-lockout valve reestablishes this communication to effect an automatic relocking operation. In another embodiment, a valve associated with the accelerator of the vehicle establishes communication between the engine intake manifold and the distributor valve only when the accelerator pedal is depressed. Therefore, when the operator leaves the vehicle, the accelerator pedal must, of necessity, be in a non-depressed condition to thereby prevent the distributor valve from effecting a relocking of the doors until such time as the accelerator pedal is again depressed subsequent to a reentry into the vehicle. The present invention will be more fully understood when the following portions of the specification are read in conjunction with the accompanying drawings wherein:

FIG. 1 is a schematic fragmentary perspective representation of a portion of a vehicle showing the door locking arrangement of the present invention;

FIG. 2 is a lay-out of the various components of a system which includes an anti-lockout valve associated with the rear pump of an automatic transmission, certain of the components of the system being in cross section and a portion of this figure being taken along line II—II of FIG. 3;

FIG. 3 is a plan view of the top of the distributor valve utilized in the present intrusion guard arrangement;

FIG. 4 is a plan view of the bottom of the distributor valve used in the present intrusion guard arrangement;

FIGS. 5 and 6 are detail views of a portion of the distributor valve of the present arrangement showing the position the elements of the valve assume under different conditions of operation;

FIG. 7 is a view in cross section of an anti-lockout valve which may be associated with the accelerator for permitting communication between the distributor valve and the intake manifold of the engine only when the accelerator is depressed;

FIG. 8 is an enlarged detail view, partially in cross section, of a portion of the fluid pressure door lock actuating motor which is shown in cross section in a portion of FIG. 2; and FIG. 9 is a view of the lock structure taken along line IX—IX of FIG. 2.

In FIG. 1 a vehicle 10 is shown having an engine 11 with an intake manifold 12. Coupled to the intake manifold by conduits 13 and 14 is a suitable vacuum tank 15 which is adapted to provide a constant source of vacuum when the vehicle is in operation, as is well known. While the present system will henceforth be described as being vacuum operated, it will be appreciated that with suitable modifications it may be operated by the use of compressed air or hydraulic fluid.

A distributor valve 16, which may be considered an energy transferring means (FIGS. 1 and 2), is provided for causing locking of the vehicle door locks when the vehicle is initially started and for permitting remote unlocking of the door locks. Distributor valve 16 (FIGS. 1 and 2) is coupled to fluid pressure tank 15 by conduit 17. Valve 16 is also coupled to engine intake manifold 12 through conduit 13, conduit 13', transmission valve 18" (which is normally closed except when the pressure produced by the rear pump of an automatic transmission causes it to open, this condition being realized only when vehicle is in motion), conduit 19, conduits 20, door valves 21, and conduits 22 and 22'. As described in detail hereafter, whenever transmission valve 18" and door valves 21 are open (as occurs whenever the vehicle is in motion and the doors are closed) the fluid presure within intake manifold 12 may actuate distributor valve 16 for causing operation of door locking motors 23 by providing them with fluid pressure from tank 15 through conduits 17 and 18, distributor valve 16, and conduits 24. As a result of this action, motors 23 motivate links 25 to place latch locks 26 in a door locking position. For the purpose of remote unlocking of the doors, conduits 24', which are coupled to distributor valve 16, are adapted to cause communication between vacuum tank 15 and motors 23 whenever manual valves 27 (which may be located on the front doors, as shown, or on the vehicle dashboard) are manipulated. This communication of the vacuum tank 15 with the portion of motors 23 which causes unlocking of latch locks 26 is effected by manipulating valves 27 to permit fluid pressure to be communicated from tank 15 through conduits 17, 28' and 28, valve 27, and conduits 29 (FIGS. 1, 2 and 3) to actuate distributor valve 16, whereby the fluid pressure tank 15 may communicate with the door unlocking portions of motor 23 through conduits 17 and 18, distributor valve 16, and conduits 24' as described in detail hereafter relative to FIG. 2. The operation of the entire locking system will become apparent from a subsequent description of the structure of FIG. 2.

Reference is now made to FIG. 2 wherein the entire system, as applied to one door, is shown in greater detail. The latch lock assembly 26 includes a wall 32 having a flange 38' extending at right angles therefrom. Pivotally mounted on flange 38' by rivet 36' is a bell crank lever 35' (FIG. 9). Affixed to one leg of bell crank lever 35' is shaft 34 of manual locking and unlocking pin 33. The other end of lever 35' has a flange 41' extending at right angles therefrom which is adapted to be received in recess 39' of link 35, which is pivotally mounted on flange 38' by rivet 37'. Link 35 has a slotted portion 40' extending substantially perpendicularly to the portion of link 35 which is riveted to flange 38', this slotted portion being adapted to receive projecting flange 42' which extends from lever 36. When lever 36 is in the position shown in the drawing, the latch lock is in a locked condition, and the movement of pin 38 to the right, as occurs when the outside door handle is manipulated, will not result in the unlocking of the door because end 39 of lever 36 will by-pass flange 40 extending from bell crank lever 30 which is pivotally mounted on wall 32 by pin 31, and the linkage for unlocking the door lock will not be actuated.

When the manual unlocking pin is moved to its upper (unlocked) position, bell crank lever 35' (FIG. 9) will be pivoted in a counterclockwise direction and link 35 in turn will pivot in a clockwise direction, thereby causing the slotted portion 40' thereof to engage flange 42' of lever 36 to cause the latter to pivot about pin 37 coupled to link 38" and thereby place end 39 of lever 36 in the position to engage flange 40 of lever 30 and rotate the latter in a clockwise direction when there is movement of pin 38 to the right (as occurs when the outside door handle is manipulated). This clockwise rotation of lever 30 will cause the leg 43' thereof which engages the recessed portion 44' of lever 41 to pivot the latter in a counterclockwise direction about pin 42 which mounts it on wall 32. This, in turn, will move end 44 of lever 41 out of engagement with ratchet wheel 45 against the bias of spring 43. Ratchet wheel 45, in turn, is coaxially mounted on shaft 47 with rotary door latch 46 so that when end 44 is moved out of engagement with the ratchet wheel, the door may be pulled to an open position because rotary door latch 46 may rotate freely relative to a striker plate (not shown) on the door jamb. When the door handle is released, spring 43, which is wound about pin 42, will bias lever 41 to the position shown in FIG. 2 and will also bias lever 38" about pivot pin 39' to cause pin 38 to return the outside door handle (or button) to a position where it can be actuated.

Notwithstanding that the latch lock 26 may be actuated to a locked position as shown in FIG. 2, the door may be unlocked from inside of the vehicle by the manipulation of door handle 50'. A link 51' (FIGS. 1 and 2) extends between handle 50' and lever 52', which is pivotally mounted on flange 38' by pin 53'. The upper end of lever 52' extends across leg 54' of bell crank lever 30. The movement of link 51' in response to the actuation of handle 50' will cause the top 55' of lever 52' to move inwardly into the plane of the drawing and thereby move end 54' of bell crank lever 30 downwardly, which, in turn, will cause lever 41 to be moved in a counterclockwise direction about pin 42 to cause the end 44 of lever 41 to be moved out of engagement with ratchet wheel 45 to permit the door to be opened.

It will be noted that link 25 extends between fluid pressure motor 23 and bell crank lever 35' (FIGS. 2 and 9). When link 25 is pulled downwardly, link 35 will be moved to the position shown in FIG. 2 to place the latch lock in a locked condition and when link 25 is moved upwardly, it will place the latch lock in the above described unlocked position. It will also be noted that link 35 is connected to one end of a snap spring 45' the other end of the spring being anchored in flange 38'. Spring 45' in conjunction with link 35, provides an over-center type of action whereby link 35 will remain in either a locked or unlocked position to which it was previously actuated until it is purposely moved to the opposite position. The operation of the above described latch lock, insofar as it relates to the present system, will be more fully understood hereafter.

Upon the initial starting of the engine 11, the increase in manifold vacuum within the engine intake manifold 12 will be communicated through conduits 13 and 14 and a check valve 48 to vacuum tank 15. The manifold vacuum will also be in communication with the conduit 13' leading to pressure responsive valve 18" which is mounted on the rear pump of the automatic transmission 49 (FIG. 1). Whenever the vehicle is in motion, the fluid pressure within the rear pump 50 of the automatic transmission 49 will cause diaphragm 51 to be distended to the left thereby causing movement of valve shaft 52 to the left also against the bias of spring 53. This, in turn, will cause valve 54 to be unseated from the position shown to thereby permit communication between conduits 13' and conduit 19. It is not deemed necessary for the purposes of the present invention to provide a detailed description of the operation or structure of the automatic transmission, but it is merely necessary to understand that the rear pump supplies pressure only when the vehicle is in motion. A transmission which produces this type of operation is shown in United States Patent No. 2,726,556. It will, therefore, be appreciated that the only time fluid pressure can be communicated through valve 18″ is when the vehicle is in motion. When the vehicle is at a standstill, there can be no such communication.

When the vehicle is in motion so that valve 18″ is opened, as described above, the manifold vacuum may communicate through conduit 19 to chamber 55 of valve 21, which may be mounted either in the vehicle door or in the door jamb. When the vehicle door is closed, pin 56 of valve 21 will be moved to the left to cause valve 57 to be unseated from its position shown in the drawing and cause valve 58 to engage seat 59. The foregoing is effected against the bias of spring 60 and through lost motion connection 61 consisting of housing 62 and spring 63. This lost motion arrangement couples pin 56 and pin 56′, which mounts valves 57 and 58. When valve 58 becomes seated, communication is established between conduit 19 and conduit 22, which leads to inlet 62 of the distributor valve 16. The lost motion connection 61 serves the purpose of taking up any play in the mechanism of valve 21 to permit proper seating of valve 58. It is also to be noted that a vent aperture 64 is provided in valve 21 to permit the atmosphere to communicate with inlet conduit 62 of valve 16 whenever valve 58 is unseated, as occurs when the door is opened.

The communication of vacuum with the inlet 62 of distributor valve 16 through valves 18″ and 21, as described above, causes vacuum to be supplied to chamber 65 of valve 16, because the vacuum within conduit 62 causes check valve 66 to move left against the bias of spring 67 and thereby permit a vacuum to be drawn through fluted bore 68 which is in communication with chamber 65.

The housing of valve 16 is partitioned by flexible diaphragm 69 into chamber 70 and the above mentioned chamber 65. The vacuum which is induced within chamber 65 during the initial phase of operation of the vehicle will cause flexible diaphragm 69 to move upwardly against the bias of spring 71 which tends to hold it in the position shown in the drawing. The upward movement of diaphragm 69 will move shaft 72, which has a portion slidable within fluted bore 68, because washer 73 abuts dished washer 74 which, in turn, engages shoulder 75 of shaft 72.

As shaft 72 and collar 76, which is affixed thereto, move upwardly, poppet valve 77 will be caused to move upwardly by spring 78 to engage seat 79 which is formed about aperture 80 in valve wall 81. This action is shown in detail in FIG. 5. It will be noted that poppet valve 82 remains on its seat 83 (because of the existence of vacuum within conduit 84 which is in communication with tank 15 through conduits 17 and 18) until such time as head 85 of shaft 72 engages poppet valve 82. Continued upward movement of valve stem or shaft 72 will thereafter cause valve 82 to be moved upwardly off of its seat after valve 77 is seated on seat 79. Valves 77 and 82 will thereafter assume the position shown in FIG. 6 and chamber 86 will be in communication with vacuum tank 15 through conduits 84, 18 and 17. The sequential action of valves 77 and 82 in the above described manner will prevent cross porting between the vacuum tank 15 and chamber 70 (which is in communication with the atmosphere through strainer 87). It is to be noted that since poppet valves 77 and 82 are slidingly mounted on the reduced diameter portion of shaft 72, the prevention of cross porting is accomplished with a minimum of mechanical linkages, thereby simplifying the construction of the valve notwithstanding the use of sequentially operating poppet valves.

A plurality of conduits 88 (FIGS. 2 and 4) are in direct communication with chamber 86. Each of these conduits is coupled directly through conduits 24′ and T-connections 89 to lock actuating motors 23. Because of the utilization of a plurality of conduits 88 and because of the use of poppet valves 77 and 82, unrestricted fluid movement produces prompt, positive, substantially simultaneous action of motors 23.

After poppet valve 82 is in an opened position, continued upward movement of diaphragm 69 will result in seating of gland valve 90 on its seat 91, thereby terminating communication between manifold 12 and chamber 65. After the foregoing occurs, spring 71 will cause flexible diaphragm 69 to return to its position shown in the drawing. A bleed screw 92 which is suitably mounted on the housing of valve 16, permits the return of air to chamber 65 at a controlled rate. The air which is trapped in chamber 70 bleeds through strainer 87.

The downward movement of diaphragm 69 causes a corresponding downward movement of dished washer 74, washer 73, washer 93, and shaft 72, washer 93 abutting collar 76 which is affixed to shaft 72. At this point it will be noted that gland valve 90 is slidingly mounted on valve stem 72 so that it remains seated on its seat 91 while the vacuum which exists in manifold 12 communicates with chamber 68, the continuous seating of gland valve 90 preventing the actuation of diaphragm 69 which would cause the recycling of distributor valve 16 due to fluctuations in the manifold pressure. Once gland valve 90 is seated on its seat 91, the pressure within the fluted bore 68 and that within conduit 62 will be equalized and therefore spring 67 will cause check valve 66 (which is, in this instance, a flapper valve) to return to its seated position because of the expansion of spring 67. The vacuum which is thus trapped in the fluted portion 68 of the valve between check valve 66 and gland valve 90 will thus assist in preventing recycling of valve 16 in response to fluctuations in manifold pressure while the engine is in operation. However, in the event that the engine is stopped so that there is a complete loss of manifold vacuum, a bleed (not shown) in flapper valve 66 will permit air to enter the fluted bore 68, and gland valve 90 will be moved away from its seat 91 due to the expansion of light spring 94 which is interposed between valve 90 and a portion of the housing of valve 16.

Collar 76 is fixedly mounted to valve stem 72, and as can be seen from FIG. 6, valve stem 72 will move downwardly a predetermined distance before collar 76 engages valve 77. However, the downward movement of valve stem 72 will cause poppet valve 82 to move downwardly therewith due to the expansion of spring 95 which is interposed between valves 82 and 77, and due to the frictional engagement between stem 72 and valve 82. However, valve 77 remains in its uppermost position shown in FIGS. 5 and 6 (because of the force exerted by spring 78) until such time that collar 76 engages it. When valves 77 and 82 are in the position shown in FIG. 5, manifold chamber 86 of valve 16 is not in communication with either chamber 86 or with vacuum tank 15. Continued downward movement of valve stem 72 due to the expansion of spring 71 will cause collar 76 to engage valve 77 and move it against the bias of spring 78 to the position shown in FIG. 2. Because of the sequential action of valves 82 and 77, cross porting through chamber 86 is prevented. More specifically, the valves 77 and 82 are so arranged on valve stem 72 that either valve seat 83 or valve seat 79 may be uncovered at any particular time but both cannot be uncovered at the same time. When valve 77 has been moved to the position shown in FIG. 2 the conduits 88 may be vented to the atmosphere through manifold chamber 86, valve opening 80, chamber 70 and strainer 87.

The above described action of distributor valve 16 upon starting of the vehicle results in automatic actuation of door locking motors 23 to a position which will cause the latch locks 26 associated therewith to lock the vehicle doors against unauthorized intrusion. More specifically, the communication between vacuum tank 15 and conduits 88 in the above described manner will cause a vacuous condition to exist in conduit 24 which is in communication with housing 96 of motor 23 through port 97'. Floatingly mounted within housing 96 are two pistons 97 and 98 each having a one-way flapper valve therein. As can be seen from FIGS. 2 and 8, one-way valve 99 in piston 97 is pulled to an open position when vacuum is applied to conduit 24. However, one-way valve 100 in piston 98 remains closed under such condition, therefore the space between pistons 97 and 98 will become evacuated and piston 98 will be caused to move downwardly against the bias of spring 101 to approach piston 97. In so doing, the under side of piston 98 engages nut 102 which is affixed to motor shaft 103 and causes it to move downwardly to be the position shown in FIG. 2. An extension of shaft 103 is suitably affixed as at 104 to link 35' of latch locking assembly 26. When link 35' is moved to its lowermost position, the latch locking assembly 26 will prevent the doors from being opened from the outside, as described in detail above. A flexible bellows 105 is suitably connected between shaft 103 and housing 96 of fluid motors 23 to prevent foreign particles from entering the housing 96.

After the latch locks have been actuated in the above described manner on the starting of the vehicle, the return of poppet valves 77 and 82 to the position shown in FIG. 2 permits motor 23 to be vented to the atmosphere through conduit 24 including T 89, conduit 88, chamber 86, valve port 80, chamber 70, and strainer 87. This will permit spring 101 to cause motor pistons 97 and 98 to return to the position shown in FIG. 2. This action of pistons 97 and 98 permits door locking and unlocking pin 22 (FIG. 2) to be actuated manually to either lock or unlock the vehicle door independently of the operation of the intrusion guard system because the movement of pistons 97 and 98 to their remote end positions after lock actuation permits nut 102 to be moved between pistons 97 and 98 without contacting them, and thereby pistons 97 and 98 do not interfere with manual actuation. A suitable vent (not shown) is provided in either piston 97 or 98 to prevent these pistons from being held together after the fluid pressure motor 23 no longer communicates with the source of vacuum.

In addition to the above described system for preventing unauthorized intrusion into a vehicle by automatically locking the vehicle doors, a remote control arrangement is provided for permitting the doors of the vehicle to be locked or unlocked from a remote position, as in the instance of admitting a passenger to the vehicle while the engine is idling. To this end, controls 27 (FIGS. 1 and 2) may be suitably positioned within the vehicle as in the front doors thereof. Alternately, a manual valve such as 27 may be positioned in the vehicle dashboard, if desired. In the event it is desired to unlock the vehicle doors from a remote position, it is only necessary to manipulate knob 106 of valve 27 in a clockwise direction about pivot pin 107 to cause valve 108 therein to unseat against the bias of spring 108'. When this occurs, vacuum will be caused to communicate between tank 15 and chamber 109 of valve 16 through conduit 17, conduit 110, chamber 111 of valve 27, conduit 112, and conduit 29. This will cause diaphragm 113, which is made out of the same piece of flexible material as diaphragm 69, to move upwardly against the bias of spring 114. This movement will be accompanied by corresponding movement of valve stem 115 and the movement of poppet valve 116 from its seat 117 to its seat 118. After this action has been completed, vacuum tank 15 will be in communication with conduit 24' and housing 96 of fluid pressure motors 23 through conduits 119 (FIGS. 2 and 4) and T connection 120. This will cause one-way valve 100 to open in a manner analogous to that described above relative to valve 99. Since one-way valve 99 of piston 97 will remain closed, the chamber between these pistons will be evacuated and piston 97 will be caused to move upwardly against the bias of spring 101. The movement of piston 97 will cause a corresponding upward movement of shaft 103 which, in turn, causes link 35 of latching assembly 19 to be moved to a position where it permits the vehicle doors to be opened by the manipulation of the outside door handle, as described above. When knob 106 of switch 27 is released, valve 108 will return to the position shown in FIG. 2. Diaphragm 113 of valve 16 will also return to the position shown in the drawing because of the expansion of spring 114 and the admission of air into chamber 109 through venting port 121. A strainer 122 (FIGS. 2 and 3) also facilitates the movement of diaphragm 113 because it permits air to enter and leave chamber 123 defined by this diaphragm and the valve housing.

In the event it is desired to relock the vehicle doors before the vehicle is placed in motion after a passenger has alighted from the vehicle, or after a passenger has entered, it is merely necessary to manipulate knob 106 of valve 27 in a counterclockwise direction about its pivot pin 107. This will cause an unseating of valve 124 to permit communication between the vacuum tank 15 and chamber 65 of valve 16 through conduits 17, 110, chamber 125 of valve 27, conduit 126 and conduit 127. This, in turn, will cause flexible diaphragm 69 to be raised to its uppermost position. The movement of flexible diaphragm 69 will cause movement of poppet valves 77 and 82, as described in detail above, to permit communication between the tank 15 and the door locking portion of motor 23 to return latch lock 26 to a locked position.

However, in accordance with the present invention, all of the doors will be automatically relocked by subsequent movement of the vehicle in the event the vehicle operator inadvertently fails to lock the vehicle doors in the above described manner, or in the event that he has no desire to do so. This is accomplished by virtue of the fact that when the vehicle door is opened so that pin 56 loses contact with door jamb 56", spring 60 within door valve 21 biases poppet valve 58 to the position shown in FIG. 2. This permits the atmosphere to communicate with valve 16 through port 64, conduits 22 and 22', and fluted bore 68 to permit spring 94 to move gland valve 90 from its seat 91, thereby resetting valve 16 for a subsequent relocking operation. However, as noted above, the valve 18" in communication with the rear pump of the automatic transmission assumes the position shown in FIG. 2 while the vehicle is at a standstill. This prevents the engine intake manifold from communicating with conduit 62 of distributor valve 16 through valve 21 while the vehicle is standing, thereby serving the dual function of preventing undesired leakage of air through the intrusion guard system into the intake manifold, as well as preventing premature actuation of distributor valve 16. However, when the vehicle is set in motion, the pressure in the rear pump of the transmission will cause the valve 54 within valve 18" to open. Communication will then be established between the engine intake manifold 12 and conduit 62 of valve 16 through transmission valve 18" and door valve 21, which is open when the door is closed. This communication will cause diaphragm 69 within valve 16 to be moved upwardly by manifold vacuum against the bias of spring 71, as described in detail above, to thereby cause vacuum tank 15 to communicate with the door locking portions of motor 23 to effect an automatic relocking operation.

Thus, not only are the doors locked when the vehicle is initially started, but they are also automatically relocked after a door is opened and closed, while the vehicle engine remains in operation. A further advantage of the present system is that the opening and closing of a door while the vehicle engine is in operation results in the automatic relocking of another door which for some reason may have been unlocked, but not opened, while the engine is in operation.

It can readily be seen that the above described valve 18" which is in communication with the rear pump of the automatic transmission positively prevents communication of the manifold 12 with conduit 62 of distributor valve 16, while the vehicle is at a standstill. Therefore, if the vehicle operator leaves the vehicle with the engine idling, and closes the door behind him, there is no possibility of vacuum being supplied to valve 16 thereby precluding the possibility of the operator being locked out of the vehicle. In other words, the door through which the operator leaves remains in an unlocked condition until such time as the vehicle is again placed in motion so that the pressure produced by the rear pump of the transmission can open valve 21 to permit communication between the engine intake manifold and distributor valve 16.

An alternate embodiment of the anti-lockout feature of the present invention is depicted in FIG. 7 wherein the valve 18' which prevents communication between the engine intake manifold 12 and conduit 62 of distributor valve 16 is actuated by accelerator pedal 128. When the operator takes his foot off of the accelerator pedal, as he must do prior to leaving the vehicle, the accelerator pedal 128 assumes the position shown in FIG. 7 and the spring 129 within valve 18' returns piston 130 to the position shown. This prevents the communication between conduits 13' and 19, and thereby prevents the engine intake manifold 12 from communicating with conduit 62 of distributor valve 16, thereby preventing the locking out of the vehicle operator. It will readily be appreciated that when the operator returns to the vehicle which has its engine idling, and steps down on the accelerator, the above communication to the door locking motors will be reestablished to thereby automatically place the latch locks 26 in their locked position without any requirement for deliberate effort on the part of the vehicle operator. As noted above, the door opening operation causes a resetting of valve 16 in preparation of the automatic relocking operation. It is to be noted, however, that this alternate embodiment is operative to prevent lock-out only when the throttle is not tampered with, as may occur when a person lifts the vehicle hood and manipulates the throttle from the engine side of the firewall.

It can thus be seen that a system has been provided for preventing unauthorized intrusion into a vehicle by maintaining the doors of the vehicle locked under substantially all conditions of operation without any requirement for deliberate effort on the part of the vehicle operator and, further, that an arrangement has been provided within the system which will positively prevent a vehicle operator from being locked out of a vehicle which is left with the engine idling.

While we have described preferred embodiments of the present invention, we desire it to be understood that it is not to be limited thereto but may be otherwise embodied within the scope of the following claims.

We claim:

1. A system for automatically maintaining the doors of a vehicle locked comprising a door in said vehicle, a door lock associated with said door, motor means operatively coupled to said door lock, a source of energy, energy transferring means including both means of automatically selectively causing communication between said motor means and said energy source in response to the operation of a predetermined part of the vehicle to cause said motor means to lock said lock and means for thereafter disrupting this communication while permitting said lock to remain in a locked condition, and means responsive to the opening of a vehicle door to reset said energy transferring means to thereby permit said energy transferring means to reestablish communication between said energy source and said door locking motor to effect an automatic relocking of said door.

2. A system for automatically placing a vehicle door in a locked condition comprising a lock in said door, motor means operatively associated with said door lock, a source of fluid pressure, valve means responsive to engine intake manifold pressure for causing communication between said motor means and said fluid pressure source to thereby actuate said motor means to place said lock in a locked condition, means in said valve means for terminating said communication after said motor means have been actuated, and resetting means operatively associated with said door for resetting said valve means in response to the opening of said door and thereby placing said valve means in condition to permit said communication between said motor means and said fluid pressure source to return said door locks to a locked condition after said door has been closed.

3. A system for preventing unauthorized intrusion into a vehicle comprising a door in said vehicle, a source of fluid pressure, a door lock associated with said door, motor means responsive to fluid pressure from said fluid pressure source for actuating said door lock to a locked position, valve means responsive to the initiation of operation of the vehicle engine for automatically causing said source of fluid pressure to communicate with said fluid pressure motor for placing said lock in a locked position and thereafter terminating said communication, and means operatively associated with said valve means and responsive to the opening and closing of said vehicle door for resetting said valve means to cause said valve means to permit said communication for relocking said door lock after it has been unlocked.

4. A system for automatically locking a vehicle door comprising a door in said vehicle, a door lock associated with said door, motor means operatively coupled to said door lock, a source of fluid pressure, first valve means adapted to be placed in communication with said fluid pressure source for selectively placing said motor means and said fluid pressure source in communication in response to the operation of a predetermined part of the vehicle for causing said motor means to place said door lock in a locked condition and thereafter terminating said communication, and second valve means operatively associated with both said first valve means and said vehicle door for resetting said first valve means during a door opening operation to permit said first valve means to reestablish communication between said fluid pressure source and said motor means upon closing of said vehicle door to effect an automatic relocking thereof.

5. A system as set forth in claim 4 including interlock means operatively associated with said motor means and responsive to the motion of said vehicle for preventing said first valve means from establishing communication between said fluid pressure source and said motor means while said vehicle is at a standstill to thereby prevent said motor means from actuating said door locks to a locked condition until said vehicle is placed in motion.

6. A system as set forth in claim 5 wherein said interlock means comprises a valve responsive to the fluid pressure in the rear pump of an automatic transmission, said rear pump producing pressure only when said vehicle is in motion.

7. A system as set forth in claim 6 wherein said interlock means comprises a valve operatively associated with the vehicle accelerator pedal for permitting said communication only when said accelerator pedal is depressed.

8. A system for preventing unauthorized intrusion into a vehicle comprising a plurality of doors in said vehicle, locks operatively associated with said doors, motor means for actuating said locks, a source of fluid pressure in said vehicle, first valve means for selectively causing communication between said source of fluid pressure and said motor means in response to the operation of a predetermined part of the vehicle to thereby place said door locks in a locked condition, means in said valve means to terminate the communication between said fluid pressure source and said motor means after said motor means are actuated, and second valve means operatively associated with certain of said doors of said vehicle for resetting said first valve means incident to a door opening and closing operation to thereby re-establish communication between said fluid pressure source and all of said door locking motors through said first valve means to thereby automatically relock said vehicle door subsequent to the closing thereof and relock any of said other doors which have been unlocked but not opened whenever said opening and closing occurs while said vehicle engine is in operation.

9. A system for preventing unauthorized intrusion into a vehicle comprising a door in said vehicle, a door lock associated with said door, a fluid pressure motor operatively associated with said door lock, a source of fluid pressure, conduit means including first, second and third valves for selectively causing communication between said source of fluid pressure to said motor, said first valve in said conduit means adapted to cause communication between said motor and said fluid pressure source when said second and third valves are open to thereby place said lock in a locked condition and thereafter disrupt this communication, said second valve operable in response to a predetermined action of the vehicle for permitting communication between said fluid pressure source and said motor when said first valve and third valves are open, and said third valve for resetting said first valve when said vehicle door is open and for permitting said fluid pressure source to communicate with said fluid pressure motor when said first and second valves are open and when the vehicle door is closed to cause automatic relocking of said vehicle door.

10. A system for preventing unauthorized intrusion into a vehicle comprising a door in said vehicle, a door lock associated with said door, motor means operatively coupled to said door lock, a source of fluid pressure, first valve means in communication with said fluid pressure source for selectively causing communication between said motor means and said fluid pressure source in response to the operation of a predetermined part of the vehicle for causing said motor means to place said door lock in a locked condition and thereafter terminate said communication, and second valve means operatively associated with both said first valve means and said vehicle door for terminating said communication between said first valve means and said fluid pressure source during a door opening operation and reestablishing said communication at the termination of a door closing operation and for causing resetting said first valve means while said door is open to thereby permit communication between said motor means and said fluid pressure source through said first valve means after said door is closed to thereby effect relocking of said vehicle door in the event it is opened and closed while said vehicle engine remains in operation.

11. A system for automatically locking a vehicle comprising a door in said vehicle, a lock operatively associated with said door, first means operable by a part of said vehicle when said vehicle is running for automatically placing said lock in a locked condition against unlocking from outside of said vehicle when said first part of said vehicle is actuated, means operatively associated with said lock for maintaining said lock in a locked condition until it is manually unlocked, manual means for selectively unlocking said lock, second means operatively associated with said first means actuated by displacement of a second part of said vehicle for automatically restoring said first means to a condition operable to lock said lock after said lock is unlocked by said manual means to thereby cause said first means to effect an automatic door locking operation in response to the continued operation of said first part of the vehicle.

References Cited in the file of this patent
UNITED STATES PATENTS

| | | |
|---|---|---|
| 2,105,350 | Fitzgerald | Jan. 11, 1938 |
| 2,110,125 | Galloway | Mar. 8, 1938 |
| 2,198,862 | Chesler | Apr. 30, 1940 |
| 2,450,372 | Craig | Sept. 28, 1948 |
| 2,505,401 | Ingres et al. | Apr. 25, 1950 |
| 2,506,851 | Ayers | May 9, 1950 |
| 2,848,057 | Forster | Aug. 19, 1958 |